Sept. 7, 1948.  E. R. CAPITA  2,448,576
SPARK GAP DEVICE
Filed Sept. 14, 1945  6 Sheets-Sheet 1
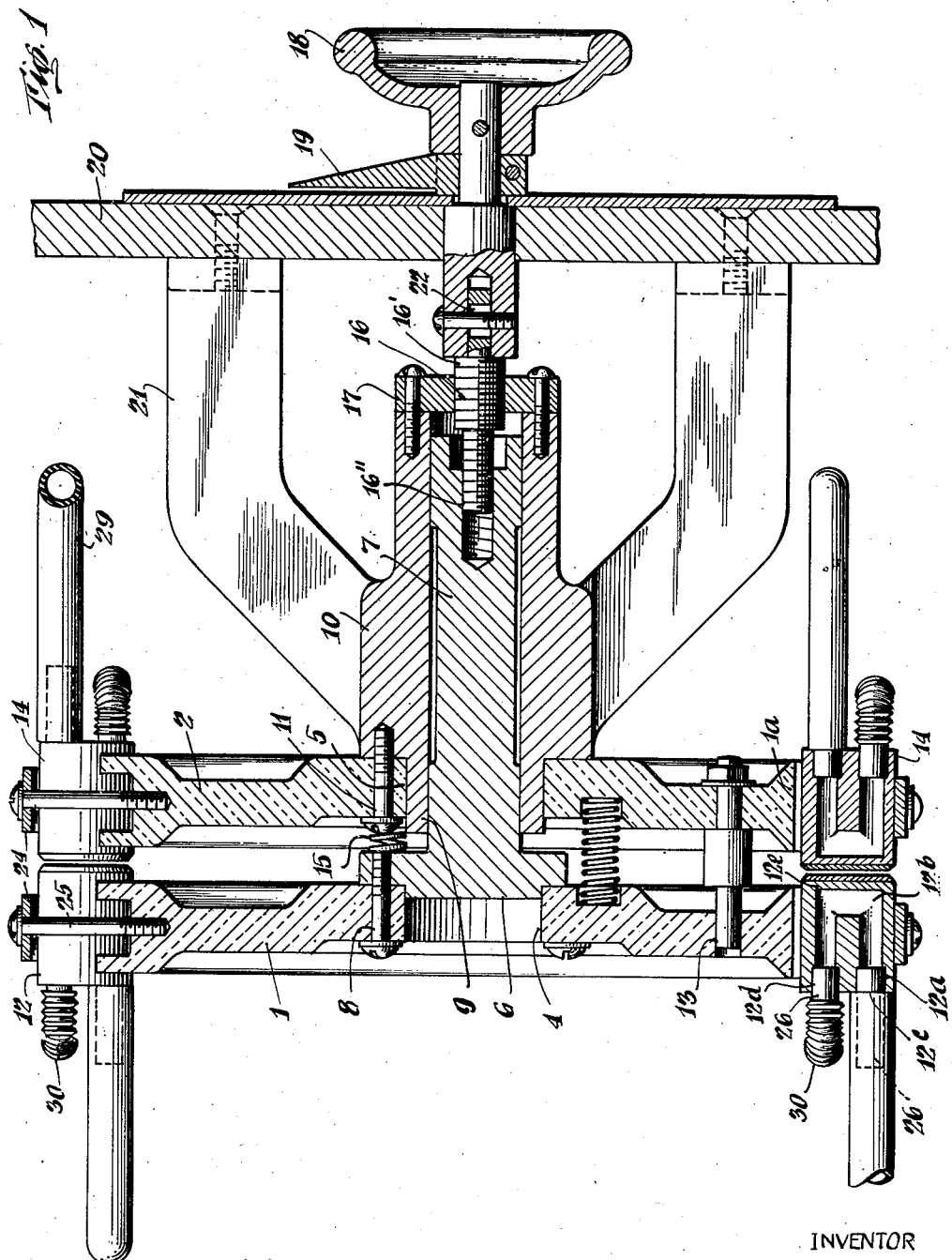
INVENTOR
Emil R. Capita
BY
Norman N. Holland
ATTORNEY Sept. 7, 1948.　　　　　E. R. CAPITA　　　　　2,448,576
SPARK GAP DEVICE
Filed Sept. 14, 1945　　　　　　　　　　　　6 Sheets-Sheet 2
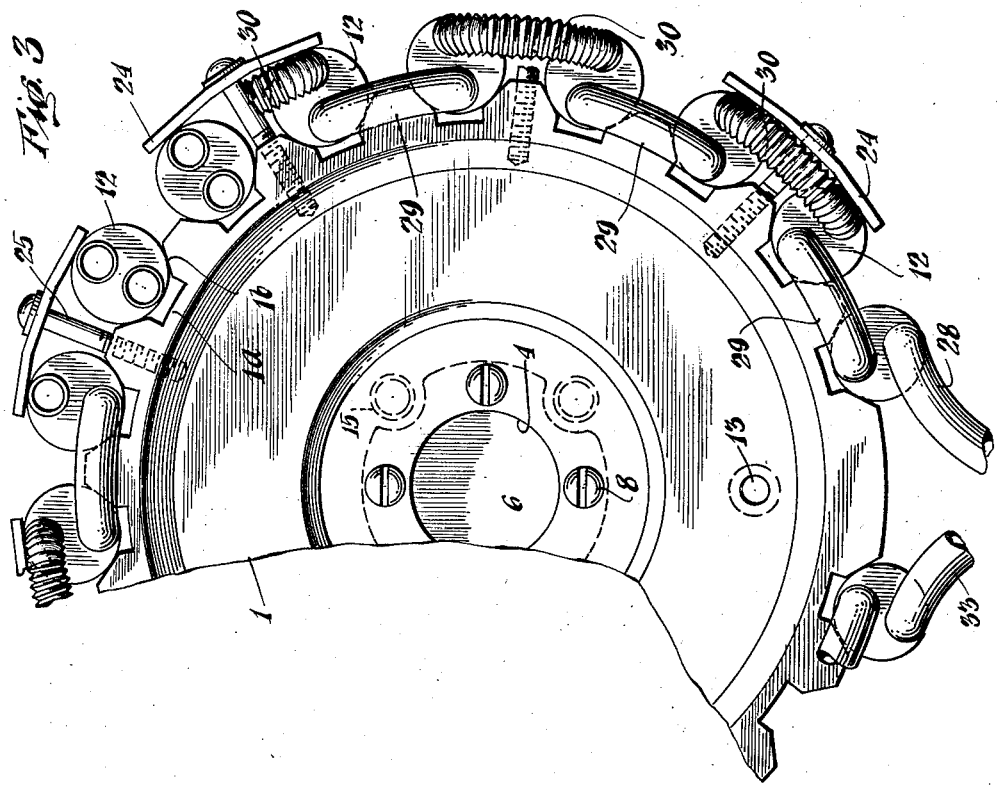
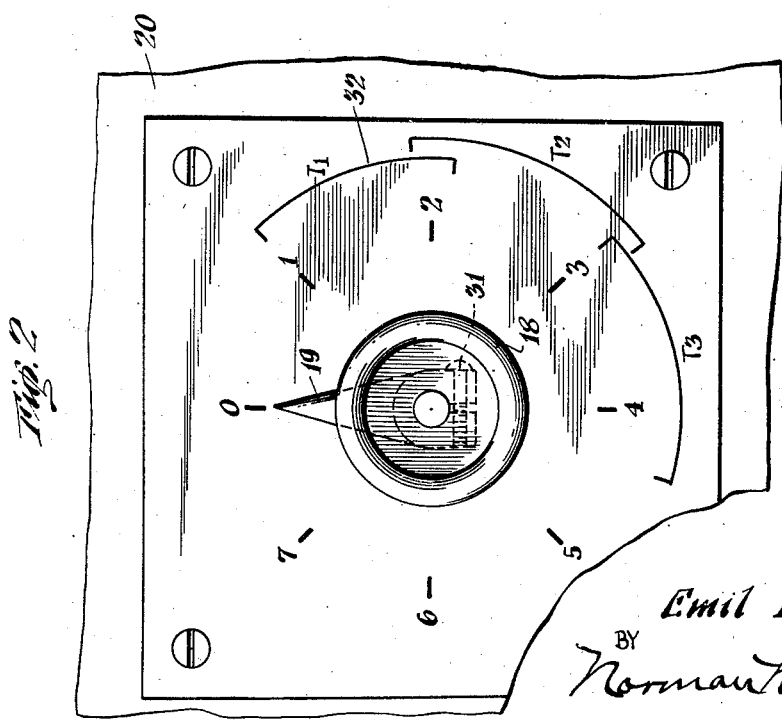
INVENTOR
Emil R. Capita
BY
Norman R. Holland
ATTORNEY Sept. 7, 1948. E. R. CAPITA 2,448,576
SPARK GAP DEVICE
Filed Sept. 14, 1945 6 Sheets-Sheet 3
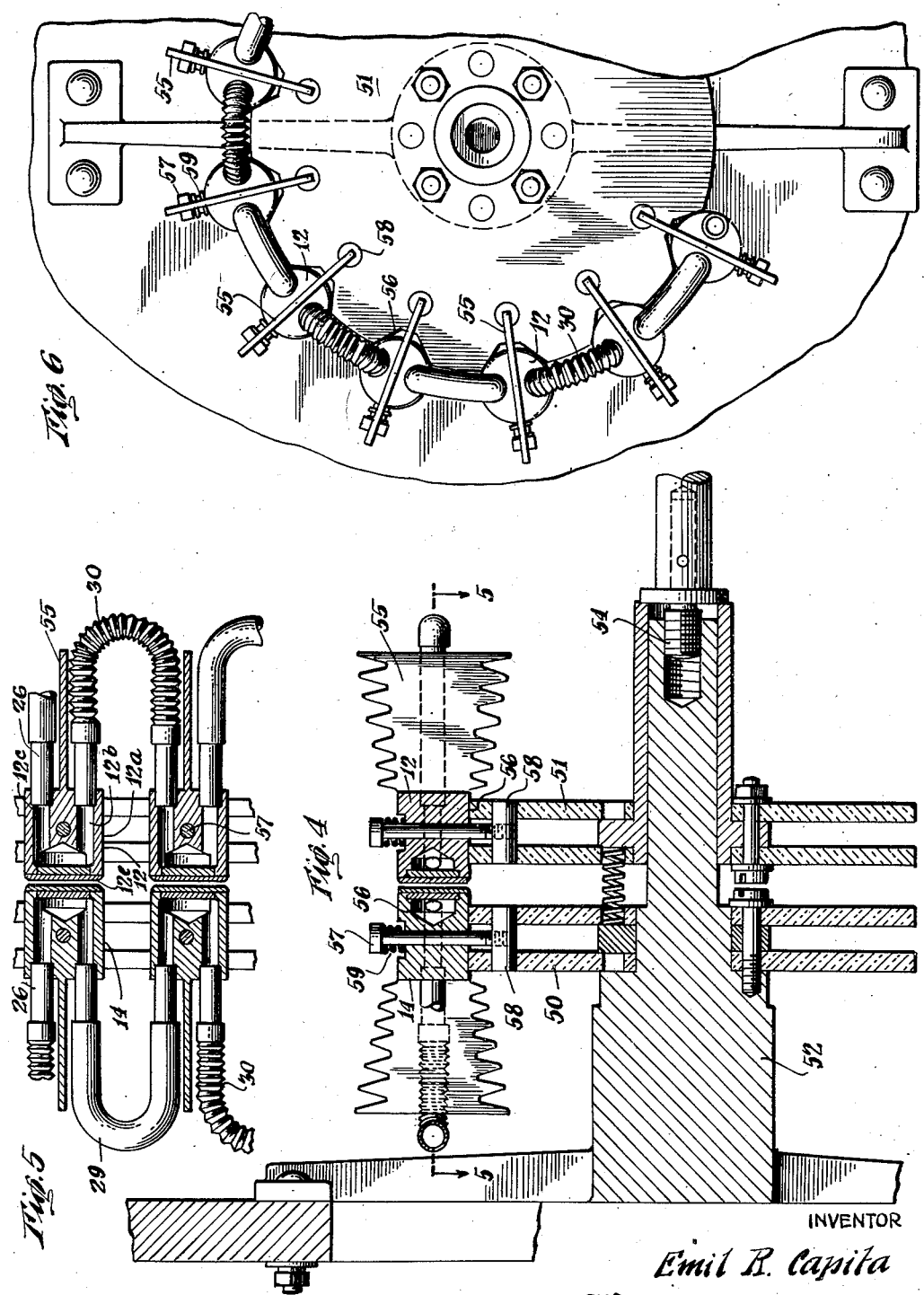
INVENTOR
Emil R. Capita
BY Norman N. Holland
ATTORNEY Sept. 7, 1948. E. R. CAPITA 2,448,576
SPARK GAP DEVICE
Filed Sept. 14, 1945 6 Sheets-Sheet 4
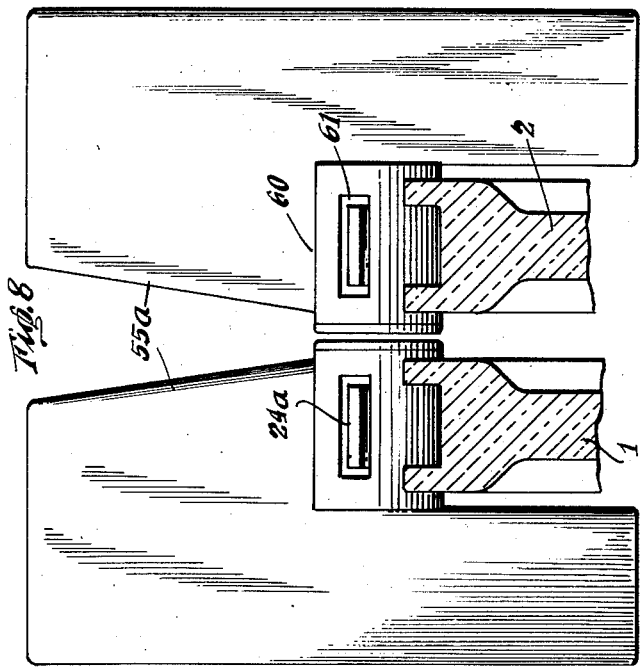
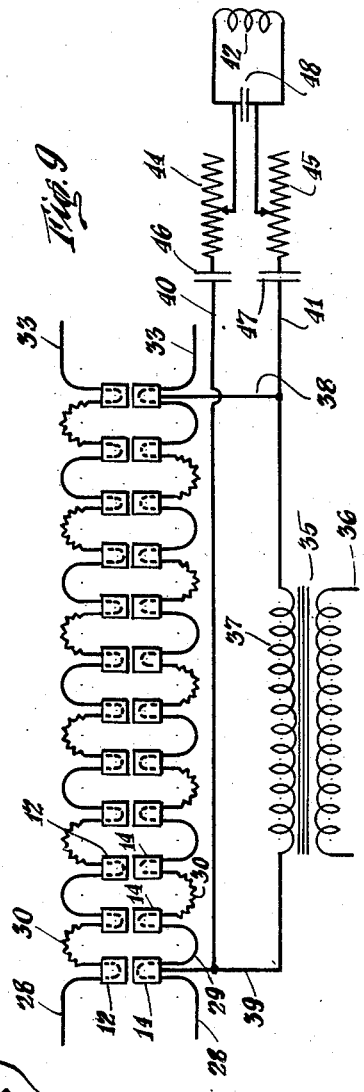
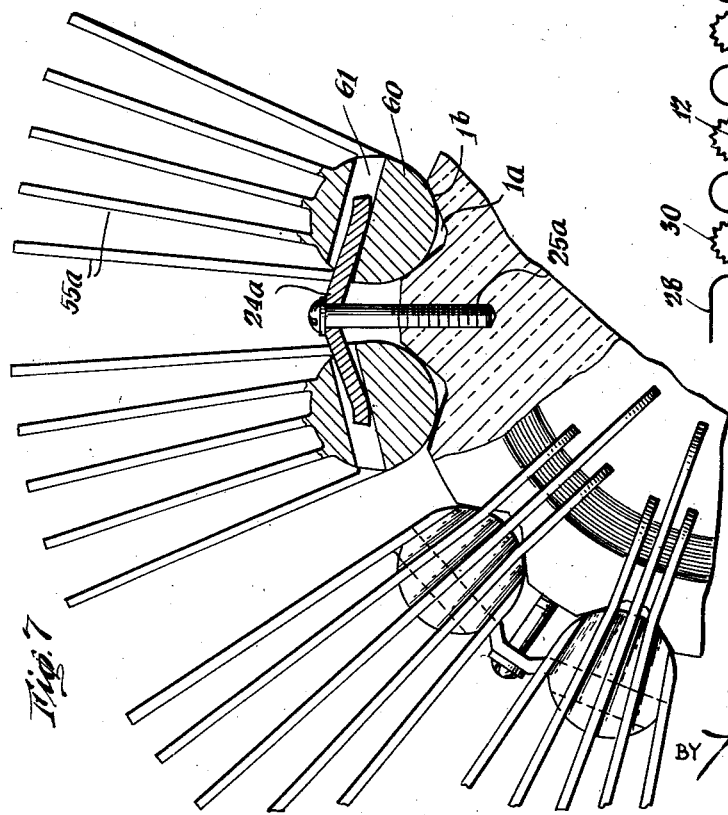
INVENTOR
*Emil R. Capita*
BY
ATTORNEY Sept. 7, 1948.　　　　　E. R. CAPITA　　　　　2,448,576
SPARK GAP DEVICE
Filed Sept. 14, 1945　　　　　　　　　　　　6 Sheets-Sheet 5
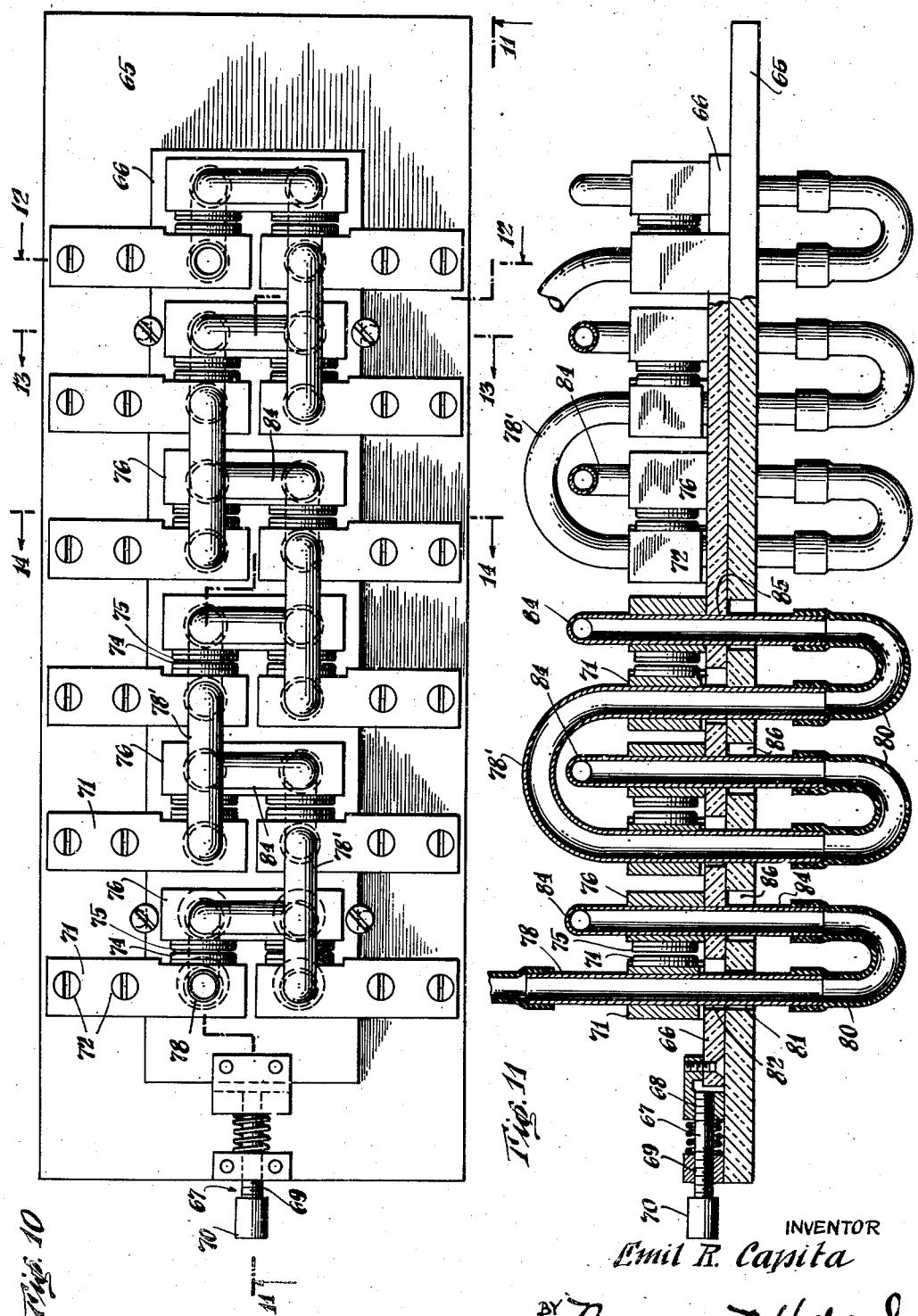
INVENTOR
Emil R. Capita
BY Norman N. Holland
ATTORNEY Sept. 7, 1948.　　　　E. R. CAPITA　　　　2,448,576
SPARK GAP DEVICE
Filed Sept. 14, 1945　　　　　　　　　　　6 Sheets-Sheet 6
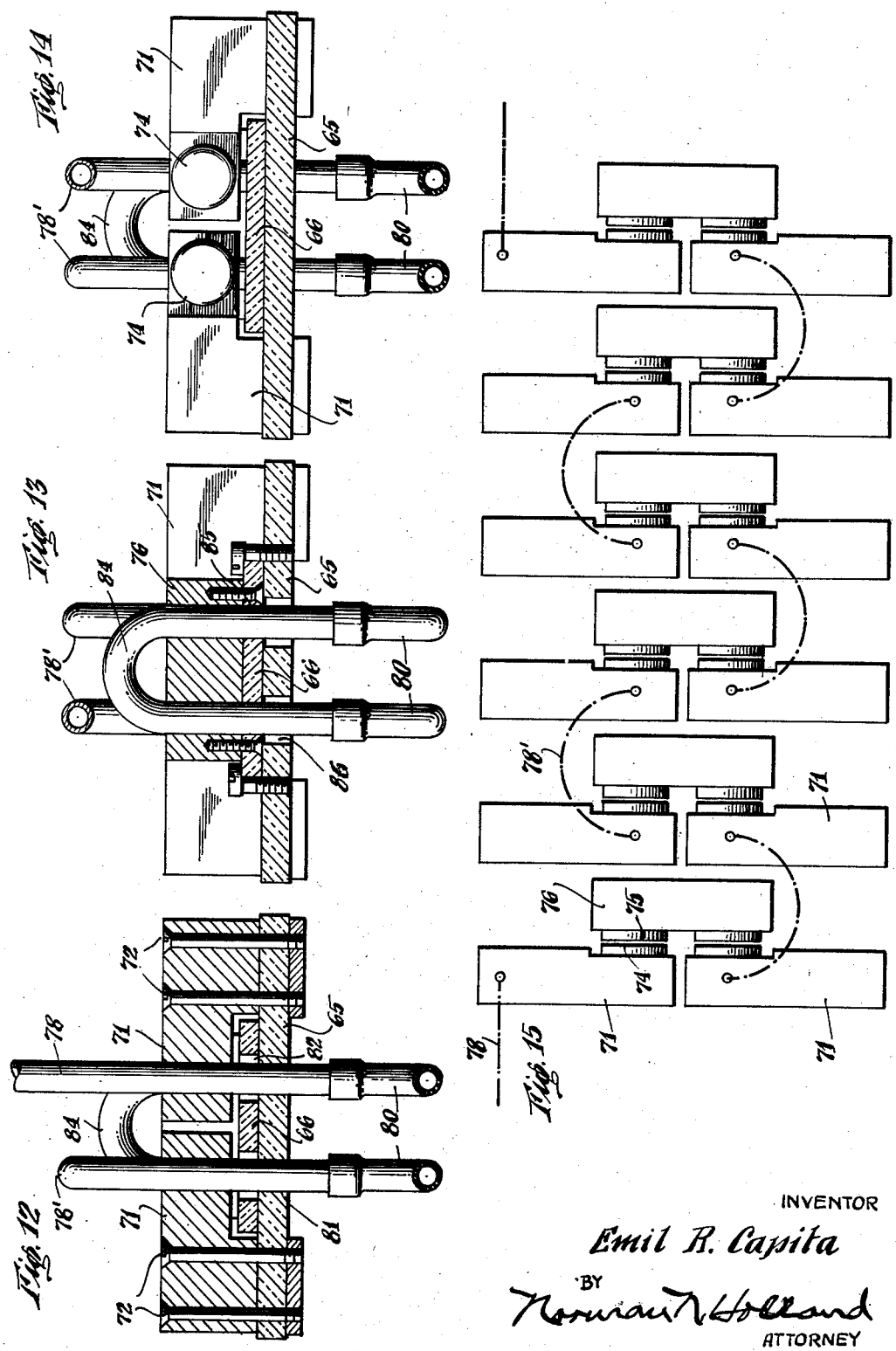
INVENTOR
Emil R. Capita
BY
Norman N. Holland
ATTORNEY Patented Sept. 7, 1948

2,448,576

UNITED STATES PATENT OFFICE 2,448,576

SPARK GAP DEVICE

Emil R. Capita, North Bergen, N. J.

Application September 14, 1945, Serial No. 616,284

17 Claims. (Cl. 315—57)

1

The present invention relates to spark gap devices and more particularly to a device having a substantial number of spark gaps which may be quickly and accurately adjusted to give maximum efficiency and which may be easily replaced when worn.

High frequency currents have been utilized in many industrial devices; they have been extensively used in heating metal parts for various purposes and particularly for case hardening. By exposing the metal part or a portion thereof to a field of high frequency currents, heating currents are induced in the part to cause rapid heating. The surface of a part may be brought to a red heat in a matter of seconds, generally less than a minute or two. Substantial power requirements at high frequencies are necessary for such purposes. The furnishing of this electric power in the form of high frequency currents presents many problems. Since it is not feasible to generate the current from a mechanically driven generator, circuits with vacuum tubes or spark gaps tuned to the desired frequency are utilized to convert commercial direct or alternating currents to high frequencies.

Spark gap circuits have distinct advantages over vacuum tube circuits, particularly where substantial power is required. However, to secure good results a number of spark gaps in series are required, sometimes as many as fifty or more. The gaps should be of the quenched type and should also be of uniform length with parallel sparking faces. The gaps heat up in operation and must be cooled to secure efficient operation and maximum wear. Wear on the sparking surfaces changes the respective gap lengths and requires in some cases adjustment of the gap length and in other cases replacement of parts. It is desirable that such adjustments and replacements be made quickly by the operator of the machine without requiring a skilled electrician.

The present invention is an improvement upon my prior Patent No. 2,300,101 granted October 17, 1942 and aims to provide an improved spark gap unit or device in which the above difficulties are minimized or eliminated.

An object of the present invention is to provide a spark gap device particularly useful in converting direct and low frequency currents into high frequency currents.

Another object of the invention is to provide a device having a series of spark gap units, the elements of which may be readily replaced at a low cost.

2

Another object of the invention is to provide a spark gap device in which all of the gaps may be quickly and accurately adjusted to the same length without disturbing the parallel relationship of their sparking faces.

Another object of the invention is to provide a spark gap unit in which all of the gaps may be adjusted simultaneously.

Another object of the invention is to provide a spark gap device in which the lengths of the gaps may be changed individually and collectively.

Another object of the invention is to provide a spark gap device in which the voltage across the gaps is varied responsively to the adjustment of the lengths of the gaps.

Another object of the invention is to provide an inexpensive spark gap unit, the parts of which may be readily replaced when worn.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a longitudinal sectional view through a preferred embodiment of the invention illustrating the location of the parts and the operation thereof;

Fig. 2 is an end view of the device illustrated in Fig. 1 showing the dial for adjusting the lengths of the gaps collectively and simultaneously changing the voltage of the circuit responsively to the gap adjustment;

Fig. 3 is an end view illustrating the mounting of the spark gap elements and the connections for cooling them;

Fig. 4 is a sectional view of another form of the invention, particularly applicable for air cooled gaps, although the device may be utilized also for liquid cooling;

Fig. 5 is a sectional view of a pair of spark gaps along the line 5—5 of Fig. 4;

Fig. 6 is a fragmentary end view of the construction shown in Fig. 4;

Fig. 7 is a fragmentary view of spark gaps in accordance with the present invention which have radiating fins to eliminate either air or liquid cooling conduits;

Fig. 8 is a sectional view illustrating the construction of Fig. 7;

Fig. 9 is a diagrammatic illustration of a spark gap unit showing the power and load connections and indicating the paths of the cooling fluid and of the electric current therethrough;

Fig. 10 is a top plan view of another embodiment of the invention;

Fig. 11 is a longitudinal sectional view through the device of Fig. 10 along the line 11—11;

Figs. 12, 13 and 14 are sectional views along the lines 12—12, 13—13 and 14—14 respectively of Fig. 10; and Fig. 15 is a diagrammatic view illustrating the electrical connections through the spark gap device shown in Figs. 10 to 14.

Referring again to the drawings, illustrating embodiments of the invention, the preferred embodiment is illustrated more particularly in Figs. 1 to 3. Referring more particularly to Fig. 1, there is shown a pair of discs 1 and 2 preferably made of porcelain, steatite or other suitable insulating material. Each of these discs has openings 4 and 5 respectively at its center with the opening of one disc fitting about a projection 6 on a mounting member 7 to which it is secured by bolts 8. The aperture 5 in the other mounting member 2 extends about a projection 9 on a member 10 and is secured thereto by bolts 11. The member 10 is telescoped about the member 7 and is slidable with respect thereto so that the mounting members 1 and 2 may be moved toward and away from each other for changing the lengths of the gaps in the spark gap units 12 and 14 mounted on their peripheries. Suitable springs 15 urge the mounting members 1 and 2 apart to facilitate the adjustment, and suitable bolts 13, on which the disc 1 is slidable, may be utilized to prevent relative rotation of the discs.

The preferred embodiment of adjusting means is shown in Fig. 1 and is herein shown as comprising a screw member 16 having a threaded portion 16' threaded into a member 17 bolted to the member 10 attached to the mounting disc 2. The screw member 16 has a second threaded portion 16" threaded into the member 7 secured to the mounting member 1. The threaded portions 16' and 16" are of a different pitch so that a compound thread action is obtained. The purpose of this is to obtain a wide arc of movement of the knob 18 and pointer 19 in changing the lengths of the spark gaps. This is very desirable by reason of the fact that the length of each gap is a very small fraction of an inch, for example about three or four thousandths of an inch. Therefore, adjustments have to be made ranging in the ten thousandths of an inch, which require accurate movements.

The compound thread illustrated enables a wider range and a more accurate adjustment than a single thread would accomplish. When the knob 18 and the pointer 19 are rotated, the threaded portion 16" draws the member 7 toward the supporting panel 20 and at the same time the threaded portion 16' tends to draw the member 10 also toward the supporting panel, but since the member 10 is fixed by reason of the mounting 21 on the panel 20, the thread merely moves forward in the member 17. A suitable slot 22 in the end of the member 16 permits it to do this. As pointed out above, the pitch of the portions 16' and 16" are different and hence the members 7 and 10, together with the spark gap mounting discs 1 and 2, are moved toward and away from each other an amount depending upon the differential of the pitch of the screw portions. In this way more accurate and infinitesimal movements may be made.

In the preferred embodiment, the spark gap elements 12 and 14 are mounted on the periphery of the mounting members 1 and 2 in a way which facilitates accurate changes in the elements and in the lengths of the gaps without impairing the parallel relationship of the sparking surfaces. Likewise the mounting facilitates liquid cooling of the gaps without interfering with convenient adjustment of the parts.

The mounting in the preferred embodiment is illustrated more particularly in Figs. 1 and 3. Preferably the spark gaps are made in the form of cylinders 12a of copper or similar material having a conduit 12b with an inlet 12c at one end and an outlet 12d at the other. Preferably the conduit is substantially U-shaped so that the liquid passes very close to the sparking surface 12e. The sparking surface may comprise a disc of tungsten welded or otherwise secured to the end of the cylindrical part 12a.

The outer periphery of each of the supporting members 1 and 2 (Fig. 3) has a series of recesses 1a flared outwardly at 1b to provide troughlike guideways. The outwardly flared portions 1b engage the cylindrical surfaces of the sparking elements 12 and 14 and permit them to slide along these guideways while maintaining the sparking faces parallel. The sparking elements may be resiliently held on the guideways by means of a spring member 24 held in position by means of a bolt 25 and bridging a pair of spark gap elements, as shown more particularly in Fig. 3. Thus the elements are resiliently retained on the guideways 1b and may slide along these while being yieldably held thereon by the spring members 24.

Preferably the spark gap elements 12 on the mounting member 1 and the spark gap elements 14 on the mounting member 2 are retained in position in the same manner. This simplifies manufacture and also simplifies replacement of parts. However, certain of the advantages of the invention may be obtained by the sparking elements of one of the discs being rigidly mounted thereon. Both the individual and collective relative movement of the respective gap element could be made with such a construction. Certain advantages could also be obtained with the sparking elements on both of the mounting members rigidly fixed in position. In that case, collective changes in the gap lengths could be made.

Suitable nipples 26 extend outwardly from the outlets and inlets 12c and 12d. These nipples may be force fitted in the inlets and outlets and may be joined by means of short rubber hose connections so that water or other fluids such as oil or air may be circulated consecutively through the spark gap elements. Oil has insulating properties which are advantageous but the construction illustrated has been found to have sufficient insulating properties, when tap water is utilized, to confine the high voltage current to the gap circuit.

Referring more particularly to Fig. 3 it will be noted that water entering through the conduit 28 passes through the first gap element 12 and from that gap element to the second by means of a rubber hose 29. The liquid then passes through the second spark gap element and on to the third through a flexible metal tube 30 and so on through all of the spark gap elements on the mounting disc 1 to the outlet conduit 33. Preferably the hose members 29 are of substantial length to prevent the current from following the liquid through this hose connection. If desired, a suitable oil which has higher insulating qualities could be utilized for this purpose. Air could also be used but is less effective than either oil or water.

It is to be noted that the spark gaps which are joined by the hose connections 29 are insulated from each other and the spark gaps which are connected by the flexible metal connection 30 are electrically connected to each other. Preferably these spark gap elements are also bridged by the spring members 24 which likewise electrically connect these parts. Since both the metal tubes 30 and the rubber hose connections 29 are flexible, the various sparking elements may move somewhat freely, in spite of the liquid connections for conducting a cooling fluid through the sparking elements.

It is to be noted that the elements of the gaps 12 and 14 are adjustable individually in their guideways and may be readily replaced by removal of the screw 25 which holds them in position through the intermediation of the bridging springs 24. This adjustment may be made manually but preferably is made by the collective control. As pointed out above, the adjustment of the spark gaps should be accurate. Furthermore, if certain of the spark gaps are wider than the others, the characteristics of the circuit are changed and the impedance of the circuit may vary widely. Minor differences in the spark gap lengths are quite important.

In the preferred embodiment the gap lengths can be readily changed by rotating the knob 18 until all of the spark gaps are in contact. As pointed out above, the various spark gaps could be moved into contact manually but the movement of the discs 1 and 2 toward each other does this collectively. After a gap is closed, further movement of the discs forces the gap elements along their guideways. Hence, the operator can continue to rotate the knob 18 until he is sure all of the gaps are closed. After all the gaps are in contact, the knob 18 may be rotated in the opposite direction and all of the gaps will be moved apart collectively the same amount so that accurate and uniform adjustment of the gap unit is quickly provided.

As the width of the gaps increases, the impedance of the circuit increases. There is a best operating voltage for each length of gap. In order to change the voltage of the circuit responsively to the length of the gap, there is provided a screw 31 (Fig. 2) for fixing the pointer 19 in position. If the pointer is adjusted to its zero position when all of the gaps are in contact, the distance the gaps are moved apart is shown by the pointer, preferably in thousandths of an inch. Preferably the pointer rod is also connected with the transformer so that the transformer voltage is changed responsively to the increase and decrease in the length of the gaps.

The transfer adjustments may likewise be indicated on the dial, as illustrated in Fig. 2 at 32 and indicated by T1, T2 and T3. In this way a critical and more efficient setting is obtainable from a given power supply transformer voltage. This critical setting not only results in a higher overall conversion efficiency when used as a source of high frequency current, but also improves the power factor of the line supply. Very accurate changes are obtained by the differential screw action described above.

After the spark gaps have been operated for a period of time, there is a tendency for them to become uneven, with the length of the gap depending upon the wear. With the present construction, the knob 18 may be moved to close all of the gaps and may then be rotated to open them a predetermined amount. Thus the gaps may be quickly adjusted to compensate for wear and to maintain uniform lengths at all times.

Referring more particularly to Fig. 9, there is illustrated diagrammatically both the flow of liquid and the flow of current through the sparking surfaces. A suitable power transformer 35 may have an iron core, a primary 36 and a secondary 37. The secondary may be connected to the spark gaps through the leads 38 and 39. The load circuit is connected in parallel with the spark gap circuit by means of leads 40 and 41. For illustrative purposes the load is shown as a coil 42 which produces a high frequency field for heating metal surfaces for case hardening and the like.

The coil 42 may be connected through variable inductances 44 and 45 and condensers 46 and 47 to the leads 38 and 39 across the secondary of the power transformer. A suitable condenser 48 may be connected across the coil 42. By varying the inductances 44 and 45 the circuit may be tuned for the particular current frequency desired. The spark gaps in series function in the usual manner. As illustrated in Fig. 9 the current flows from the end spark gap element 14 across the gap to the spark gap element 12 and then through the flexible metal tube 30 to the adjoining spark gap 12 and across that gap to the element 14 and so on throughout the spark gap unit.

Likewise the water or other cooling fluid comes in through the conduit 28 and passes through the first spark gap element 14 through the hose connection 29 into the second spark gap element 14 and from the second spark gap element through the flexible metal tube 30 to the third spark gap element, and so on through the elements 14. A similar connection extends through the spark gap elements 12. Thus neither the electric nor water connections interfere with the length changes in the spark gaps.

Referring more particularly to Figs. 4, 5 and 6, illustrating another embodiment of the invention, particularly adapted to air cooling, mounting discs 50 and 51 which serve the same purpose as mounting discs 1 and 2, described above in Figs. 1 to 3, are shown made of two parts mounted upon a hub 52. These discs may be moved toward and away from each other by means of the screw 54 as described more particularly in the preferred embodiment. The spark gaps in the present construction have conduits extending through them somewhat similar to the conduits 12b in the gap elements 12 and 14 of the preferred embodiment and these parts have been correspondingly numbered. Likewise the connections for the air passing through the spark gap elements are substantially similar to the preferred embodiment, and these connections have also been similarly numbered.

The spark gaps preferably have a fin 55 which assists in dissipating the heat in addition to that which is dissipated by means of the air passing through the conduits of the gap elements. The mounting of the gaps is somewhat although they are mounted in guideways 56 similar to those in the preferred embodiment. The gaps, however, are held in position by means of a threaded bolt 57 (Fig. 4) which passes through the gap and is threaded into a cylindrical member 58 fitting into apertures in the parallel plate discs 50 and 51.

These members 58 may slide in their apertures and hence the spark gaps may slide along their guideways moving the bolt member 57 therewith, the friction resisting the sliding being controlled by springs 59.

The operation of the construction is substantially the same as that described in the preferred embodiment and a repetition of the operation at this point would be superfluous. In the movement of the mounting members which change the gap lengths, a screw thread action is utilized, but the compound action illustrated in the preferred embodiment is not included. It could be utilized if desired, the alternate form being shown to illustrate that the compound adjustment is not essential but desirable.

A further embodiment is illustrated in Figs. 7 and 8 in which a series of fins 55a are utilized to avoid the requirement of cooling fluids for the sparking elements. The dissipation of heat depends in a large measure upon the amount of cooling surfaces. Hence the inclusion of the fins 55a greatly increases the radiating surface and for many types of work this may be sufficient without utilizing fluid connections for passing cooling fluids through the respective elements.

The mounting of the sparking elements 60 is on the same principle as in the previous embodiments but the spring 24a, held in position by a bolt 25a, preferably fits in a slot 61 in the spark gaps. Thus the spring connection does not interfere in any way with the fins radiating outwardly from the surface of the elements. Otherwise the mounting of the elements 60 is substantially the same as in the preferred embodiment and a detailed description thereof and of the operation of the parts is not believed to be necessary.

Referring to the embodiment illustrated in Figs. 10 to 15 of the drawings, there is shown a pair of mounting members 65 and 66 which slide on each other, one above the other. These base members may be of porcelain, steatite or other insulating material and are operatively connected by a screw member 67, threaded at 68 into an extension from the upper base member 66 and threaded at 69 into a bracket from the lower base member 65. A suitable knob 70 may be utilized for rotating the threaded member to slide the two mounting members with respect to each other. The lower mounting member 65 has a series of spark gap elements 71 secured thereto by bolts 72. Preferably each element has a pair of bolts holding it in place to assure accurate positioning thereof so that the sparking surfaces 74 thereon will be parallel to the sparking surfaces 75 of the spark gap elements 76 on the base member 66. The spark gap elements 76 on the upper mounting member 65 are shorter than those on the lower member and have sparking surfaces 75 which face the sparking surfaces 75 on the other elements. Thus when the knob 70 is rotated to slide the mounting members with respect to each other, the spark gap surfaces are opened or closed as desired without disturbing their parallel relationship. For the purpose of cooling the spark gap elements, metal tubes 78 and 78' are passed vertically through the elements 71. The tubes 78', connecting two of the spark gap elements 71, may be U-shaped as shown in Fig. 11. The ends of the tubes at the bottom extend downwardly through the base members so that they may be joined by suitable hose connections 80.

The base member 65 has openings 81 sufficiently wide to receive these tubes but they do not have to be larger than the tubes since the sparking element is fixed with respect to the member 65. However, the corresponding aligned opening 82 in the upper mounting member 66 should be sufficiently long to permit the mounting members to slide a reasonable amount without engaging the tube. This relationship of the parts is shown more particularly in Fig. 11.

Likewise the spark gap element 76 on the upper base member has a series of U-shaped tubes 84 passing therethrough and projecting at their lower ends to receive the hose connections 80. These tubes pass through the upper base member and the apertures 85 therein may fit snugly, but apertures 86 in the lower mounting member should be sufficiently large to permit relative movement between the tube and the base member. In this way the two base members may be moved with respect to each other to adjust the position of the sparking elements.

The U-shaped tubes passing through two of the elements serve not only to conduct liquid through these two elements but also to connect the two elements electrically, while the hose connections 80 serve to connect the elements for the flow of water from one to another but insulate the elements against the passage of current therebetween. Therefore, those spark gap surfaces having tubes which are joined by the hose connections 80 are electrically insulated and hence the current has to jump the gaps in order to pass from one to the other. The hose connections also permit relative movement between gaps so connected.

Referring to Figs. 10 and 11, it will be noted that the current entering the upper left gap element 71 jumps the gap to the gap element 76 and then jumps from the lower end of the gap element 76 over to the lower left gap element 71. The lower end gap element 71 is connected by a U-shaped metal tube to the second lower gap 71 (Fig. 10) and the same operation is repeated. The dot-dash lines in Fig. 15 illustrate the gaps which are electrically connected by means of the U-shaped tubes 78'. Of course, the gaps on the upper base 76 have two sparking surfaces joined together and facing the sparking surfaces 74 on two gap elements 71. Thus liquid may be conducted through the various gaps without interfering with the electrical connections and without interfering with the group adjustment of the gaps. This construction provides different means for obtaining many of the advantages of the preferred embodiment in a simple and compact construction and may be desirable in certain instances.

The constructions herein illustrate several embodiments of the invention without any intention of limiting the invention to these embodiments and without any intention of including herein all of the embodiments of the invention. The present disclosure is intended to be illustrative and not intended to limit the invention beyond its true and comprehensive scope in the art.

It will be seen that the present invention provides an improved spark gap device in which the spark gap lengths are individually and collectively variable. All of the gaps may be quickly and accurately changed to any desired length and all of the gaps will have that length. Thereby a critical and more efficient setting is obtained from a given power supply voltage. This critical setting not only results in a higher overall conversion efficiency when used as a source of high frequency current, but also improves the power factor of the line current supply. The various gap elements may be quickly replaced when worn. The accurate adjustment of the gaps and their efficient cooling minimizes wear and adds to their life and usefulness. The parts are made from easily obtained material and are rugged in construction to withstand the rough usage to which they may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a quench gap device, the combination of a first mounting member, a plurality of spark gap elements secured to said first mounting member, a second mounting member, a plurality of spark gap elements secured to said second mounting member, the spark gap elements on the first mounting member having sparking surfaces facing toward the elements on the second mounting member, the spark gap elements on said second mounting member having sparking surfaces facing toward the sparking surfaces of the elements on said first mounting member and means including a compound screw member for moving said mounting members with respect to each other to vary the lengths of the gaps between the sparking surfaces.

2. A device in accordance with claim 1 in which the spark gap elements are water cooled by means of a substantially U-shaped groove connected with inlet and outlet conduits at the ends thereof opposite to said sparking surfaces.

3. In a spark gap device, the combination of a first means provided with grooves for mounting a group of sparking elements, a second means provided with grooves for mounting a second group of sparking elements, a group of sparking elements mounted in said grooves on each of said means, and devices for moving said first and second means toward and away from each other to adjust all of the spark gaps simultaneously.

4. In a spark gap device, the combination of a member having a plurality of guideways therein, a plurality of sparking elements in said guideways, means for slidably retaining said sparking elements in said guideways, a second plurality of sparking elements aligned with the sparking elements in said guideways, means for moving said first and second plurality of sparking elements into contact to obtain uniform adjustment of each pair of aligned sparking elements, and for moving them out of contact to provide spark gaps of uniform length for the respective pairs of aligned sparking elements.

5. In a spark gap device, the combination of a member having a plurality of guideways therein, a plurality of sparking elements in said guideways, each having exterior surfaces adapted to complement surfaces on said guideways to accurately position said sparking elements upon insertion thereof in said guideways, means for yieldably retaining said sparking elements in said guideways, a second plurality of sparking elements aligned with the sparking elements in said guideways, means for moving said first and second plurality of sparking elements into contact, and for moving them out of contact to provide spark gaps of uniform length and means for flowing a cooling fluid through said sparking elements.

6. In a sparking gap device, the combination of a member having a plurality of substantially parallel guideways, spark gap elements mounted in said guideways and having a sparking face on one end thereof, resilient means bridging alternate pairs of elements to slidably hold the elements in the guideways, and spark gap elements having end sparking faces adjoining the faces respectively of the spark gap elements in said guideways, and means for simultaneously changing the lengths of all of the spark gaps.

7. In a spark gap device, the combination of a mounting member having a plurality of guideways therein, a plurality of sparking elements in said guideways, a second mounting member and a plurality of sparking elements on said second member aligned with the sparking elements of said first mounting member, alternate pairs of said sparking elements on each mounting member being electrically connected, the electrically connected pairs on one mounting element bridging the end elements of adjoining pairs on the other mounting member to connect the gaps in series.

8. In a spark gap device, a mounting member having a plurality of guideways therein, a plurality of sparking elements in said guideways, a second mounting member, a plurality of sparking elements on said second member aligned with the sparking elements of said first mounting member, alternate pairs of said sparking elements on each mounting member being electrically connected, the electrically connected pairs on one mounting element bridging the end elements of adjoining pairs on the other mounting member to connect the gaps in series, a wall portion within each of said sparking elements forming a substantially U-shaped passageway therein, and means for conducting a cooling liquid through the passageways of said sparking elements.

9. In a spark gap device, the combination of a mounting member having a plurality of opensided recesses therein, a plurality of sparking elements in said recesses, a second mounting member, a plurality of sparking elements on said second member aligned with the sparking elements of said first mounting member, alternate pairs of said sparking elements on each mounting member being electrically connected, the electrically connected pairs on one mounting element bridging the end elements of adjoining pairs on the other mounting member to connect the gaps in series, means for conducting a cooling liquid through said sparking elements and means for moving said mounting members relative to each other to vary the gap lengths.

10. In a device of the class described, the combination of a first plurality of spark gap elements each so mounted as to be movable to a new position upon application of endwise pressure, a second plurality of spark gap elements in endwise alignment respectively with the elements of said first plurality of spark gap elements, whereby said spark gaps may be individually adjusted, means for moving one plurality of spark gap elements in endwise manner with respect to the other to apply endwise pressure to said movable plurality of spark gap elements for movement thereof and to facilitate simultaneous adjustment of the lengths of all of the spark gaps, and means for conducting a liquid through said elements to cool them.

11. In a device of the class described, the combination of a disc-like mounting member having a plurality of apertured sparking elements secured thereto adjacent the periphery thereof, a second disc-like mounting member, a plurality of apertured sparking elements secured to said second member adjacent the periphery thereof and aligned with the sparking elements of said first mounting member, inlet and outlet conduits from each of said elements, and means connecting the outlet of each element with the inlet of the adjoining elements on the respective mounting members to convey liquid through the apertures of the elements, alternate connecting means being of an electrically non-conducting material and other alternate connecting means being of electrically conducting material.

12. In a device of the class described, the combination of means for mounting a plurality of sparking elements, a plurality of sparking elements yieldably mounted on said means, a second means for mounting a plurality of sparking elements, a plurality of sparking elements on said second means in alignment with the sparking elements on said first means, means for moving said first and second means toward each other to force the aligned sparking elements into contact and for moving them from each other to provide gaps of uniform length.

13. In a device of the class described, the combination of means for mounting a plurality of sparking elements, a plurality of sparking elements yieldably mounted on said means, a second means for mounting a plurality of sparking elements, a plurality of sparking elements on said second means in alignment with the sparking elements on said first means, means for moving said first and second means toward each other to force the aligned sparking elements into contact for effecting adjustment thereof and for moving them from each other to provide gaps of uniform length, and means for flowing a liquid through said elements.

14. In a device of the class described, the combination of a pair of members having surfaces mounted in sliding contact with respect to each other, a plurality of sparking elements mounted on each member, each element on one member being aligned with an element on the other member, means for sliding said surfaces of said members along each other and with respect to each other, simultaneously to change the lengths of the gaps of said sparking elements, and means for conducting liquid through said elements to cool them.

15. In a spark gap device, the combination of a spark gap, means for changing the length of the gap and a transformer operatively connected with said means for simultaneously effecting changing of the transformer voltage across the gap in accordance with the change in the length of the gap.

16. In a spark gap device, the combination of a plurality of spark gaps, means for changing the lengths of the gaps simultaneously and a transformer operatively connected with said means for simultaneously effecting changing of the voltage across the gaps in accordance with the change in the length of the gaps.

17. In a quench gap device, the combination of a first mounting member, a plurality of spark gap elements each slidably secured to said first mounting member, a second mounting member, a plurality of spark gap elements each slidably secured to said second mounting member, the spark gap elements on the first mounting member having sparking surfaces facing toward the elements on the second mounting member, the spark gap elements on said second mounting member having sparking surfaces facing toward the sparking surfaces of the elements on said first mounting member, and means including a compound screw member for moving said mounting members with respect to each other to vary the lengths of the gaps between the sparking surfaces.

EMIL R. CAPITA.

REFERENCES CITED

The following references are of record in the file of this patent:

UNITED STATES PATENTS

| Number | Name | Date |
|---|---|---|
| 1,761,082 | Liebel | June 3, 1930 |
| 1,764,279 | Osborn | June 17, 1930 |
| 1,791,464 | Flarsheim | Feb. 3, 1931 |
| 2,381,648 | Curtis | Aug. 7, 1945 |

FOREIGN PATENTS

| Number | Country | Date |
|---|---|---|
| 590,841 | France | June 23, 1925 |